US007204238B2

(12) United States Patent
Pozgainer et al.

(10) Patent No.: US 7,204,238 B2
(45) Date of Patent: Apr. 17, 2007

(54) FUEL TANK COMPRISING AN AERATION SYSTEM

(75) Inventors: Günther Pozgainer, Graz (AT); Sandor Palvölgyi, Gleisdorf (AT)

(73) Assignee: Tesma Motgoren-Und Getriebetechnik GmbH, Sinabelkirchen (AT)

( * ) Notice: Subject to any disclaimer, the term of this patent is extended or adjusted under 35 U.S.C. 154(b) by 0 days.

(21) Appl. No.: 10/552,862

(22) PCT Filed: Apr. 7, 2004

(86) PCT No.: PCT/AT2004/000120

§ 371 (c)(1),
(2), (4) Date: Dec. 2, 2005

(87) PCT Pub. No.: WO2004/089673

PCT Pub. Date: Oct. 21, 2004

(65) Prior Publication Data

US 2006/0144372 A1 Jul. 6, 2006

(30) Foreign Application Priority Data

Apr. 8, 2003 (AT) ............................ GM246/2003

(51) Int. Cl.
*F02M 33/04* (2006.01)
*F02M 33/02* (2006.01)

(52) U.S. Cl. ...................................... 123/519; 123/516

(58) Field of Classification Search ................ 123/516, 123/518, 519, 520, 521, 509
See application file for complete search history.

(56) References Cited

U.S. PATENT DOCUMENTS 4,703,737 A * 11/1987 Cook et al. ................. 123/520
4,919,103 A 4/1990 Ishiguro et al.
5,901,689 A * 5/1999 Kimura et al. .............. 123/518
5,970,958 A * 10/1999 DeLand et al. ............. 123/520
6,206,057 B1 * 3/2001 Benjey et al. .............. 141/198
6,354,280 B1 * 3/2002 Itakura et al. .............. 123/519
6,536,261 B1 * 3/2003 Weldon et al. ............... 73/49.7
6,609,537 B1 * 8/2003 Horrer et al. ............... 137/587
7,077,112 B2 * 7/2006 Mitani et al. ............... 123/518
2004/0187850 A1 * 9/2004 Bergsma ..................... 123/520

FOREIGN PATENT DOCUMENTS

DE 199 54 541 5/2001

* cited by examiner

*Primary Examiner*—Mahmoud Gimie
(74) *Attorney, Agent, or Firm*—Bachman & LaPointe, P.C.

(57) ABSTRACT

A fuel tank with ventilation system and activated carbon filter which, on the one hand, is connected by a first line (22) to the fuel tank and by a second line (25) to an internal combustion engine, and, on the other hand, by a third line (26) to the atmosphere, should have as simple and compact a ventilation system as possible, which fulfills all functions in full measure. To this end, a controlled two-way valve unit (23) is provided, whereof the first path connects the first line (22) to the third line (26) and the second path connects the second line (25) to the third line (26), and an electronic control unit (28) is provided, which on the input side is connected to a refueling sensor (7) and to a liquid level sensor (13) and on the output side is connected to the controlled two-way valve unit (23). The controlled two-way valve unit (23) comprises two valves (45, 46) accommodated in a common housing (40) and having closing bodies (47, 48), whereof the first (47) closes off or opens up the first path and the second (48) closes off or controllably opens up the second path.

17 Claims, 7 Drawing Sheets

FUEL TANK COMPRISING AN AERATION SYSTEM

BACKGROUND OF THE INVENTION

The invention relates to a fuel tank with ventilation system, wherein the fuel tank has a filler pipe, a filler neck with refueling sensor and a liquid level sensor, and the ventilation system comprises an activated carbon filter which, on the one hand, is connected by a first line to a vapor space of the fuel tank and by a second line to the induction tract of an internal combustion engine, and, on the other hand, by a third line to the atmosphere, an electronic control unit being provided, which on the input side is connected to the refueling sensor and to the liquid level sensor and on the output side is connected to the controlled valves, in such a way that the first and the third line, and also the second and the third line, can be mutually connected. The third line is separated from the first and second by the filter mass of the activated carbon filter. The vapor space is naturally in the upper part of the fuel tank.

Such fuel tanks with ventilation system are today firmly established within automobile construction for reasons of environmental protection. The ventilation systems fulfill a number of functions: they conduct the fuel-vapor-containing air, which has been compressed in the refueling operation and formed by evaporation, to the activated carbon filter, they conduct induction air through the activated carbon filter, for scavenging thereof, into the induction tract of the internal combustion engine (generally with the aid of a simple valve), cause the fuel nozzle to cut out as a result of the increase in pressure when maximum filling is reached, and prevent liquid fuel from escaping as a result of inertia forces or if the vehicle should overturn. For this purpose, float valves, nonreturn valves and rollover valves, all of them passive valves, are known. The various components of a ventilation system, as, too, those of the fuel supply system as a whole, are usually disposed at different places on or around the fuel tank and are connected to the latter by lines.

From U.S. Pat. No. 4,919,103, an installation of the generic type is known in which, in addition to the fuel pump, an activated carbon filter is also fitted inside the fuel tank. The line connections to and from the activated carbon filter are fitted, however, on the outside, and merely provided with simple nonreturn valves. A valve is seated on the filler neck and is mechanically opened upon introduction of the fuel nozzle and thus opens up a special line from the vapor space of the fuel tank to the activated carbon filter. A drawback with this installation is that the activated carbon filter is scavenged in an uncontrolled manner during normal running of the engine, in which case vapors can also be sucked up from the fuel tank. The emission limits which are currently in force can thus no longer be met, future ones still less.

From US 2001/0025668 A1, an installation according to the preamble of the 1st. claim is known, the valves of which are individually disposed at various places outside the fuel tank. In this particular installation, the activated carbon filter is fitted outside the tank. Consequently, the cost of pipework and command system, as well as the spatial requirement, is considerable. From U.S. Pat. No. 6,273,070 B1, it is known to equip an activated carbon filter with compartments for receiving various devices, including, inter alia, a so-called “rollover valve”, and to accommodate said filter inside a fuel tank.

The object of the invention consists in equipping a fuel tank with as simple and compact a ventilation system as possible, which fulfills all functions in full measure.

SUMMARY OF THE INVENTION

According to the invention, the controlled valves are amalgamated into a controlled two-way valve unit, where of the first path connects the first line to the third line and the second path connects the second line to the third line.

The bringing-together of all three lines within one valve unit reduces the manufacturing costs and allows them to work together in specific operating modes. The electronic control unit remedies the shortcomings of the existing systems and yields, if used consistently, not only functional but also cost benefits for all functions. A single valve unit thus acts like a scavenging valve and a refueling limit valve.

The arrangement is preferably made such that the two-way valve unit opens up the first path when the refueling sensor indicates a refueling situation and when the fill level sensor indicates a value below a specific fill level; and closes off the first path once the specific fill level is reached, and such that the control valve opens up the second path when the activated carbon filter is due to be scavenged. The unimpeded and yet filtered discharge of the compressed vapor-air mixture during refueling is thereby ensured, even at high output. When the maximum fill level is reached, the first valve closes, whereby the pressure inside the tank rises with the result that the fuel nozzle cuts out. The second valve serves to control the scavenging of the activated carbon filter, so that this too can be extensively governed.

A lesser improvement, yet one which is only now possible by virtue of the control system, consists in the fact that the control valve, after the specific fill level has been reached, closes off for a specific period, with the result that the fuel nozzle cuts out, and then reopens it, so that a little more fuel can be delivered without spitback.

In a tank system according to the invention, an automatic (non-controlled) valve, possibly a float valve, can be provided in the first line, though this is not a requirement of the invention. Advantageously, the automatic valve in the first line is a rollover valve, which is provided in a separating vessel provided in the tank and flow-connected to the inside of the fuel tank. In addition, within the scope of the invention, at least one pipe can be run from the separating vessel to a higher situated point inside the fuel tank, which pipe ends there with a slosh valve.

In a preferred embodiment of the invention, the controlled two-way valve unit is fitted directly to the activated carbon filter, i.e. integral therewith or directly connected thereto. The reduction in component parts and line connections which is thereby obtained additionally makes it possible to integrate and standardize the entire subassembly and to fit it as a whole. These advantages can be further enhanced if the entire ventilation system is accommodated inside the fuel tank. Moreover, the entire tank system is thus able to be installed in the vehicle with just a few maneuvers on the assembly line.

For the design of the controlled two-way valve unit, there are a wide variety of options within the scope of the invention. In a particularly advantageous embodiment, the two-way valve unit comprises two valves accommodated in a common housing and having closing bodies, whereof the first closes off or opens up the first path and the second closes off the second path or opens it up partially or in full in a controllable manner. Combined within a structural unit there are therefore two independently controllable closing bodies, namely one which, for the control of the exhaust gas emissions, can be controlled between fully closed and fully open, and one which, for safe refueling, can be rapidly closed.

In an advantageous refinement, the housing of the controlled two-way valve unit has three line connections in T-arrangement, the line connections to the fuel tank and to the internal combustion engine lying in a first common axis and the line connection to the third line, which line connection is common to both valves, transversely thereto, and the two closing bodies are displaceable along a second common axis, the two axes being at least parallel (or even congruent), and the first closing body interacts with a valve seat assigned to the first line connection and the second closing body interacts with a valve seat assigned to the second line connection, each closing body boasting its own electric actuator and the closing directions of the two closing bodies being mutually opposed. In this way, a housing is obtained which is of particularly simple construction and which can be worked or sprayed and the two valves are given the opportunity, despite independent actuators, to work together in an operating mode.

The action and interaction is particularly simply and reliably achieved by the fact that, for the actuation of the first closing body, a magnetic coil, acting in the direction of opening, and a flip-flop spring are provided and, for the actuation of the second closing body, a magnetic coil is provided, which acts upon the second closing body, in a controllable manner in the direction of opening, counter to the force of a spring, the first valve being brought into the closed setting once the second valve is fully opened. In this way, a control system which is functionally correct in all respects is able to be created with simply constructed actuators. By virtue of the inventive arrangement, the second valve can be easily coupled to the first valve by mechanical persuasion, in the simplest case touching, of that end of the second closing body facing away from the second valve seat onto that end of the first closing body facing away from the first valve seat. The two valve bodies are, so to speak, back to back. This also serves to ensure that, when the activated carbon filter is scavenged, the connection to the inside of the fuel tank remains closed under all circumstances.

A further increase in safety is obtained by the fact that between the first line and the third line there exists a bypass, in which a pressure-equalizing valve unit is provided. This ensures that in normal travel (when the activated carbon filter is specifically not being scavenged) pressure fluctuations inside the fuel tank are equalized in both directions. To this end, the pressure-equalizing valve unit contains an overpressure valve and an underpressure valve, the overpressure valve having a closing element which, on the one hand, is connected to the inside of the fuel tank and, on the other hand, is connected to the atmosphere, and the underpressure valve being a nonreturn valve which opens in case of underpressure in the fuel tank. Finally, yet further simplification and cost reduction can be achieved by structurally combining the pressure-equalizing valve unit with the two-way valve unit.

BRIEF DESCRIPTION OF THE DRAWINGS

Below, the invention is described with reference to diagrams of a preferred illustrative embodiment and its working method explained, wherein.

DETAILED DESCRIPTION

Figure 1:
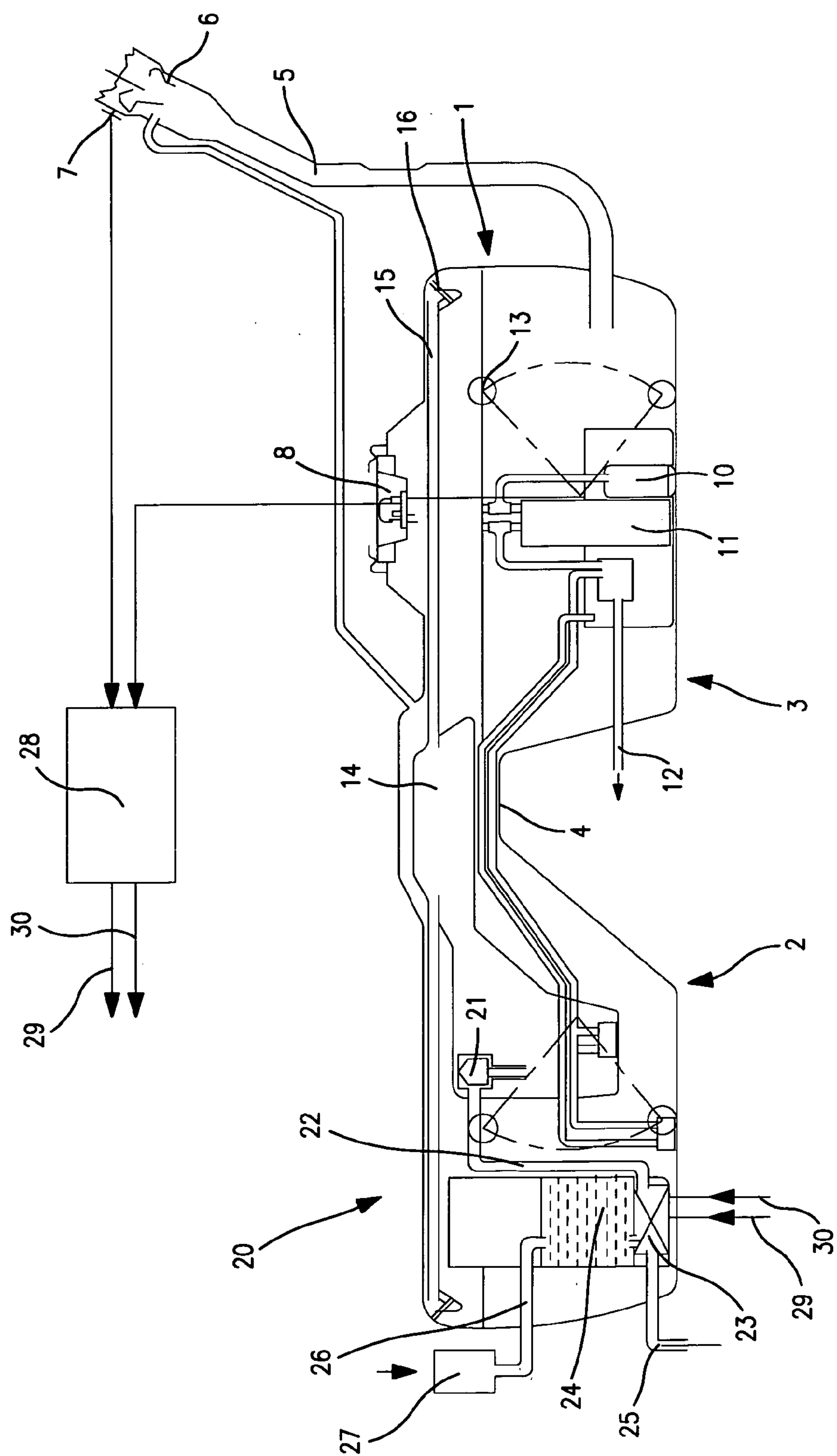
FIG. 1 represents a general view of the subject of the invention.

In FIG. 1, the casing of a fuel tank is summarily denoted by 1. In the illustrative embodiment shown, the tank consists of a left part 2 and a right part 3, which are mutually connected by a wasp waist 4. The shape derives from the installation requirements of the respective motor vehicle. The fuel tank 1 is filled via a filler pipe 5, the filler neck 6 of which is equipped with a refueling sensor 7. This can be inductive, capacitive, magnetic or in some other way electrical; in any event it generates a refueling signal when the filler neck 6 is opened or when a fuel nozzle (not represented) is introduced. At the highest point of the tank 1, an arbor having a service opening 8 is provided, through which the various electrical connections and signal lines are run.

Inside the tank there are a number of built-in components: a fuel pump 10, a fuel filter 11 from which a fuel line runs to the internal combustion engine (not represented), a liquid level sensor 13, which generates a liquid level signal, and a separating vessel 14. The latter is located as high up as possible in the tank 1 and is connected by pipes 15 to the inside of the tank 1, in particular to the vapor space present above the level of the liquid. At the end of the pipes 15, slosh valves 16 are provided, which largely prevent liquid from penetrating into the separating vessel 14.

In the left part 2 of the tank 1, there is provided the ventilation system, summarily denoted by 20. It is located wholly inside the tank 1. Inside the separating vessel 14, at the top, there is an automatic valve 21, here a rollover valve. From this a first line 22 runs to a two-way valve unit 23, which is fixedly attached to an activated carbon filter 24. From the two-way valve unit 23, a second line 25 runs to an internal combustion engine (not represented) and, on that side of the activated carbon filter 24 which is remote from the valve unit 23, a third line 26 runs via an air filter 27 to the outer atmosphere (=environment).

The refueling signal from the refueling sensor 7 and the liquid level signal from the liquid level sensor 13 make their way via the indicated lines to a control unit 28, which, on the basis of these and, where necessary, further signals, determines control signals for the two-way valve unit and powers the latter via a power supply (not represented), this being indicated with the lines 29, 30.

Figure 2:
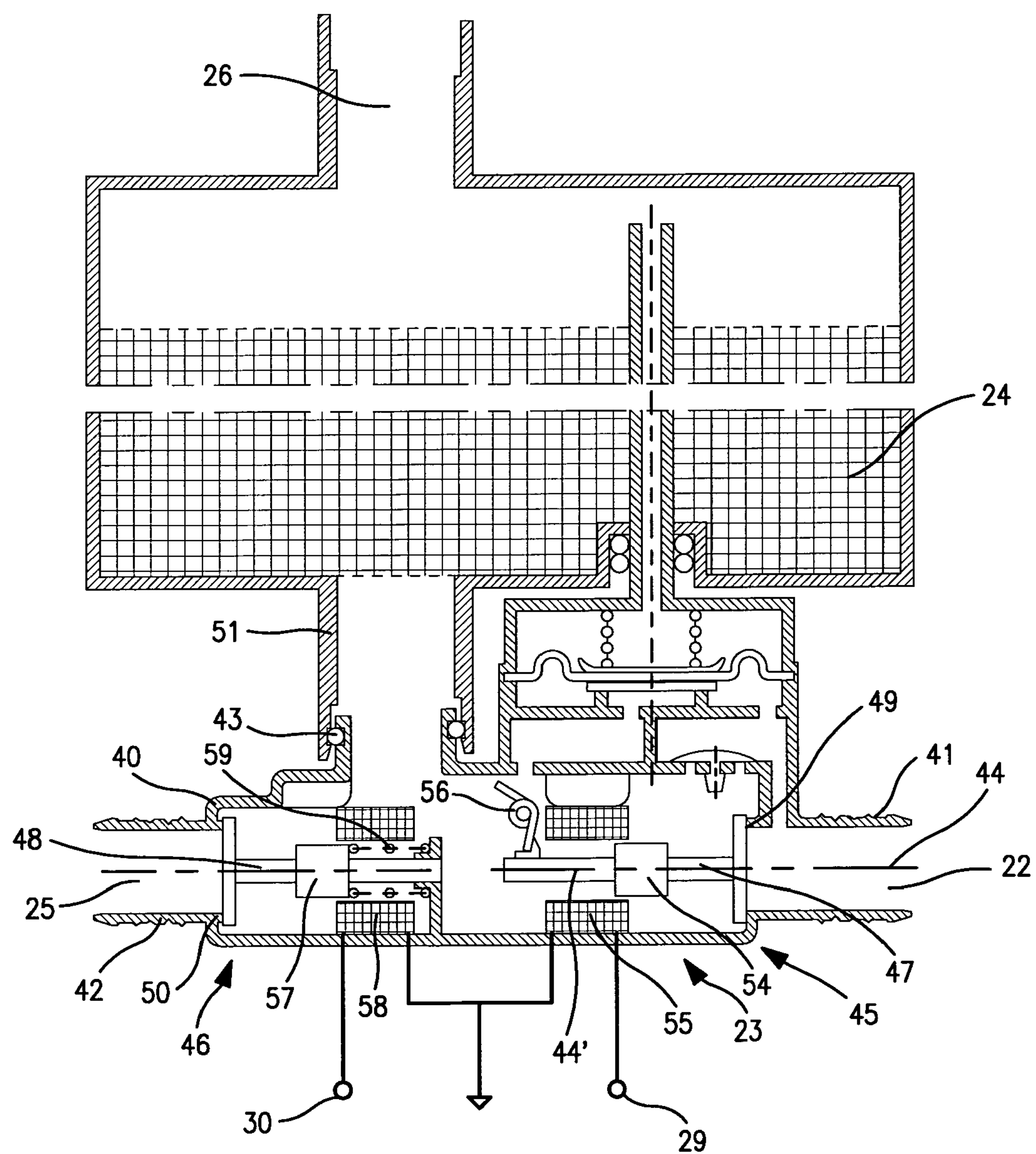
FIG. 2 represents detail A in a first operating setting.

In FIG. 2, the two-way valve unit 23 can be seen in greater detail. Its housing 40 firstly possesses a first line connection 41 to the first line 22, a second line connection 42 to the second line 25 and a third line connection to the third line 26. The two line connections 41, 42 lie in a common axis 44 and the third line connection 43 at a right angle thereto. The three line connections thus form a T-junction, with the common axis 44 as the crossbar. The "T" is thus standing on its head. The third line connection 43 here connects to a connecting branch 51 of the activated carbon filter 24, but the housing 40 could also connect without this connecting branch 51 directly to the activated carbon filter, or could be integral with the housing thereof.

Inside the housing 40 can be found a first valve 45 and a second valve 46. The former has a closing body 47, which is movable in the direction of the axis 44' and which interacts with a first valve seat 49, which, for its part, is assigned to the first line connection 41. The closing body 47 is a spindle-shaped body having a first magnetic core 54, which is acted upon by a first magnetic coil 55 and a flip-flop spring 56. The flip-flop spring 56 ensures that the first closing body 47 can stay only in one of the two end settings and does not open, moreover, as a result of the underpressure generated in the scavenging.

The second valve 46 has a second closing body 48, which interacts with a second valve seat 50, which, for its part, is assigned to the second line 25. The second closing body 48 is again spindle-shaped, having a line aligned along the axis 44' and a second magnetic core 57, which is acted upon by a second magnetic coil 58 and a compression spring 59. The position of the second closing body 48 is continuously adjustable between the fully closed and the fully open setting. The electric wires 29, 30 from the control unit 28 or the associated power supply are here connected to the two magnetic coils 55 and 58, only the common mass being indicated.

The setting shown in FIG. 2 corresponds to the operating mode: normal travel without scavenging of the activated carbon filter. In this setting, the two valves 45, 46 are closed. The first valve, by virtue of the flip-flop spring, is fixed in the closed setting, even though the first magnetic coil is currentless. The second valve 46 is likewise currentless; it is held in the closed setting by the compression spring 59.

Figure 3:
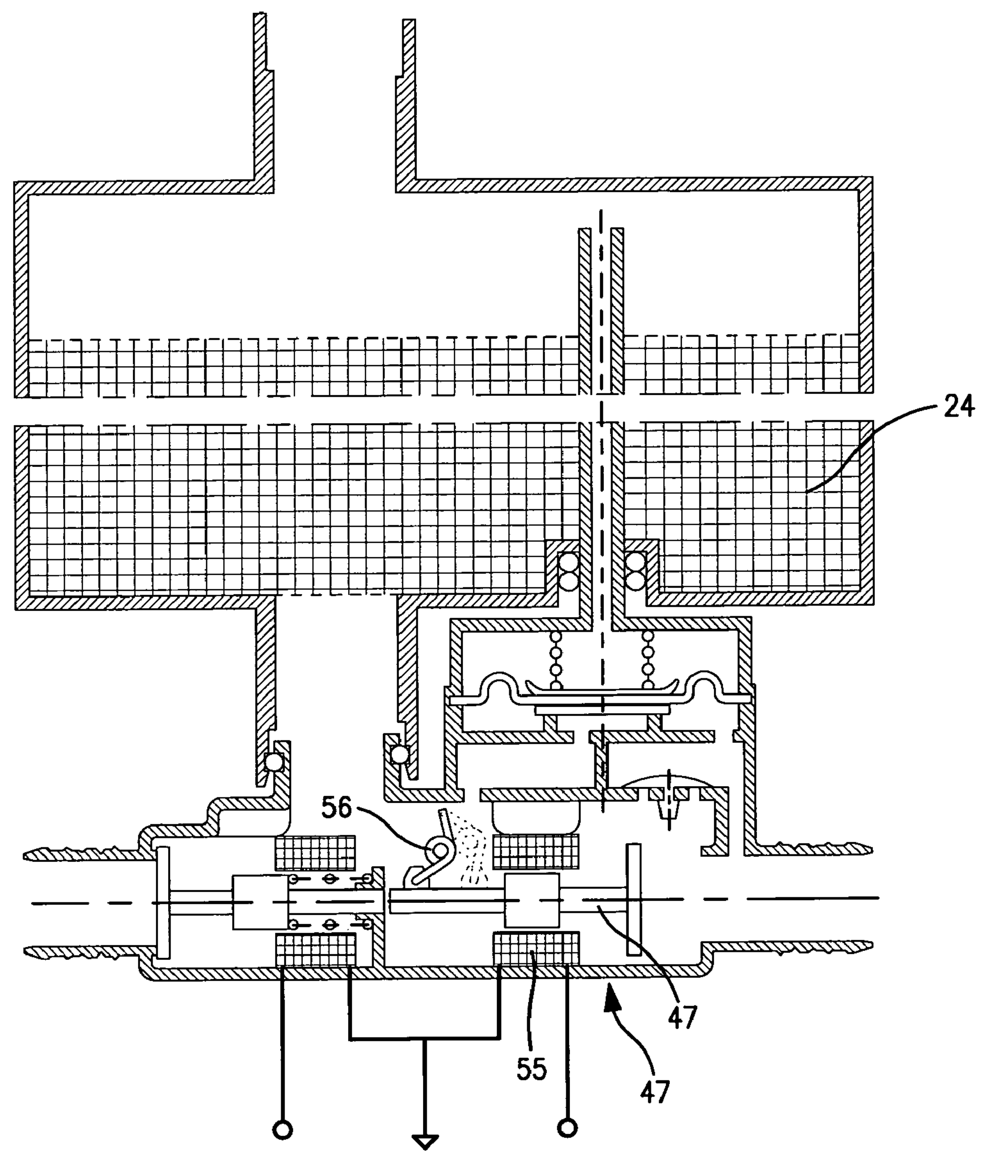
FIG. 3 represents detail A in a second operating setting.

FIG. 3 shows the operating mode: vehicle refueling. When the filler neck 6 is opened for the refueling and when the fill level measured by the fill level sensor 13 lie below a predefined value, the control unit 28 deduces from these two signals that the vehicle is due to be refueled and causes the first valve 45 to open by a brief supply of current to the magnetic coil 55. The first closing body 47 is thereby moved to the left in the picture, whereupon the flip-flop spring 56, here a hairpin spring as indicated, makes its way from one extended position into the other. As a result of the open first valve 45, the flow connection between the inside of the tank 1 and the activated carbon filter 24 is now established and the compressed vapor-saturated air is able to make its way through the valve unit 23 and the activated carbon filter into the open.

Figure 4:
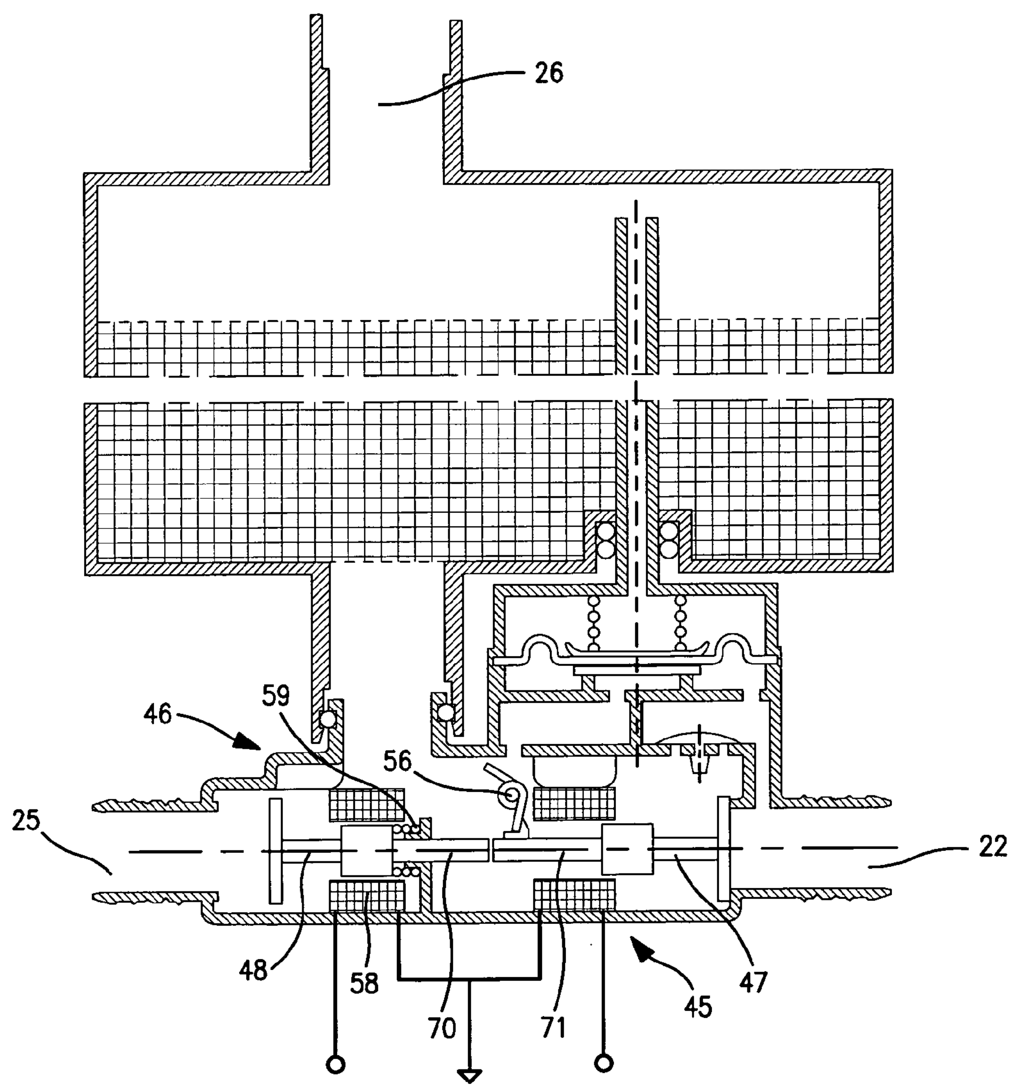
FIG. 4 represents detail A in a third operating setting.

FIG. 4 shows the operating mode: tank full, refueling ended. As soon as, in fact, starting from the setting of FIG. 3, the fill level sensor 13 indicates that a predefined limit value (corresponding to filled tank) is reached, the control unit 28 brings an end to the refueling by causing current to be supplied to the second magnetic coil 58, whereby the second closing body 48 of the second valve 46 is moved to the right counter to the force of the spring 59. Hence, to begin with, the connection between the second line 25 and the third line 26 to the atmosphere is created.

In addition, the rear end 70 of the second closing body 48 touches the thereto facing rear end 71 of the first closing body 47 and pushes the latter into the depicted closed setting, in defiance of the flip-flop spring 56. Consequently, the vapor-saturated air compressed by the refueling can no longer flow away through the first line 22 and the pressure inside the tank 1 rises. This rise in pressure is felt by the fuel nozzle (not represented), which cuts off the fuel pump. The refueling operation is at an end. Since, however, the second magnetic coil 58 has only briefly been supplied with current, the second closing body 48, following interruption of the coil current, reverts back into the closed setting.

The actuator of the second valve 46 has thus been used to move the first valve 45 in one direction. The first valve 45 can thus make do with a simple-working actuator and can nevertheless close very quickly. It can additionally be provided that the control unit 28, following a predefined time interval, reopens the first valve 45 in order to prevent spitback resulting from a fall in pressure.

Figure 5:
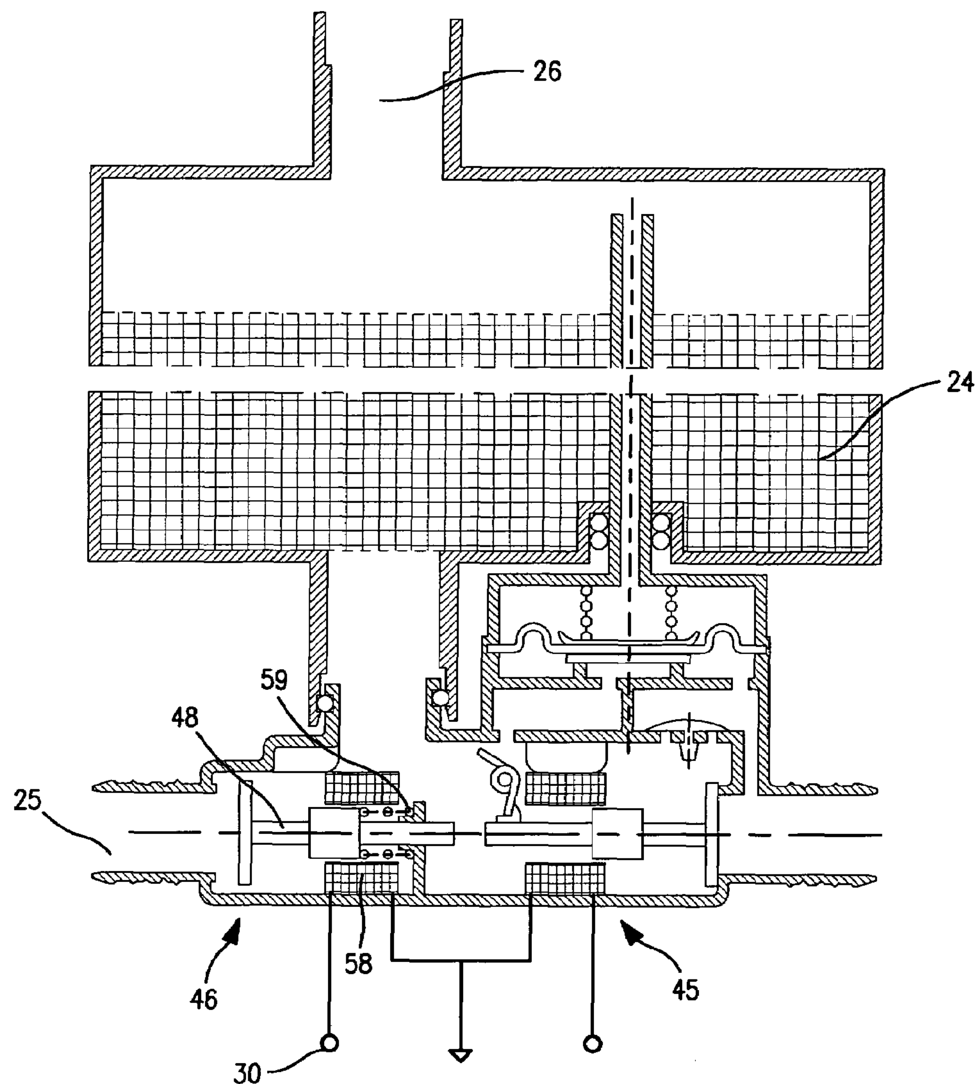
FIG. 5 represents detail A in a fourth operating setting.

FIG. 5 shows the operating mode: filter regeneration, scavenging of the activated carbon filter. This operating mode is initiated by the control unit 28. This has programmed into it at what time intervals and in which operating modes the activated carbon filter 24 shall be regenerated. When, starting from the normal mode of FIG. 2, with closed first valve 45, the regeneration of the activated carbon filter 24 is due to be initiated, the second magnetic coil 58 is supplied with current, with the result that the second valve 46 opens in defiance of the compression spring 59. The filter regeneration takes place at a specific load state of the internal combustion engine when the vehicle is in travel, yet it should not here lead to any deterioration in the exhaust gas composition, nor to the overloading of any catalyzer which may be present.

For this reason, the signal generated by a lambda sensor accommodated in the exhaust system of the vehicle (and therefore not represented) also makes its way to the control unit 28, which, by suitable commanding of the second valve 46, ensures an emission-optimal progression of the filter regeneration. To this end, the second valve 46 is controllable, that is to say that the current supplied to the second magnetic coil 58 via the line 30 is metered or modulated or cycled in such a way that the closing body 48 acts as a control valve by which the air current running out of the third line 26, through the activated carbon 24, and via the second line 25 to the internal combustion engine, is regulated.

Figure 6:
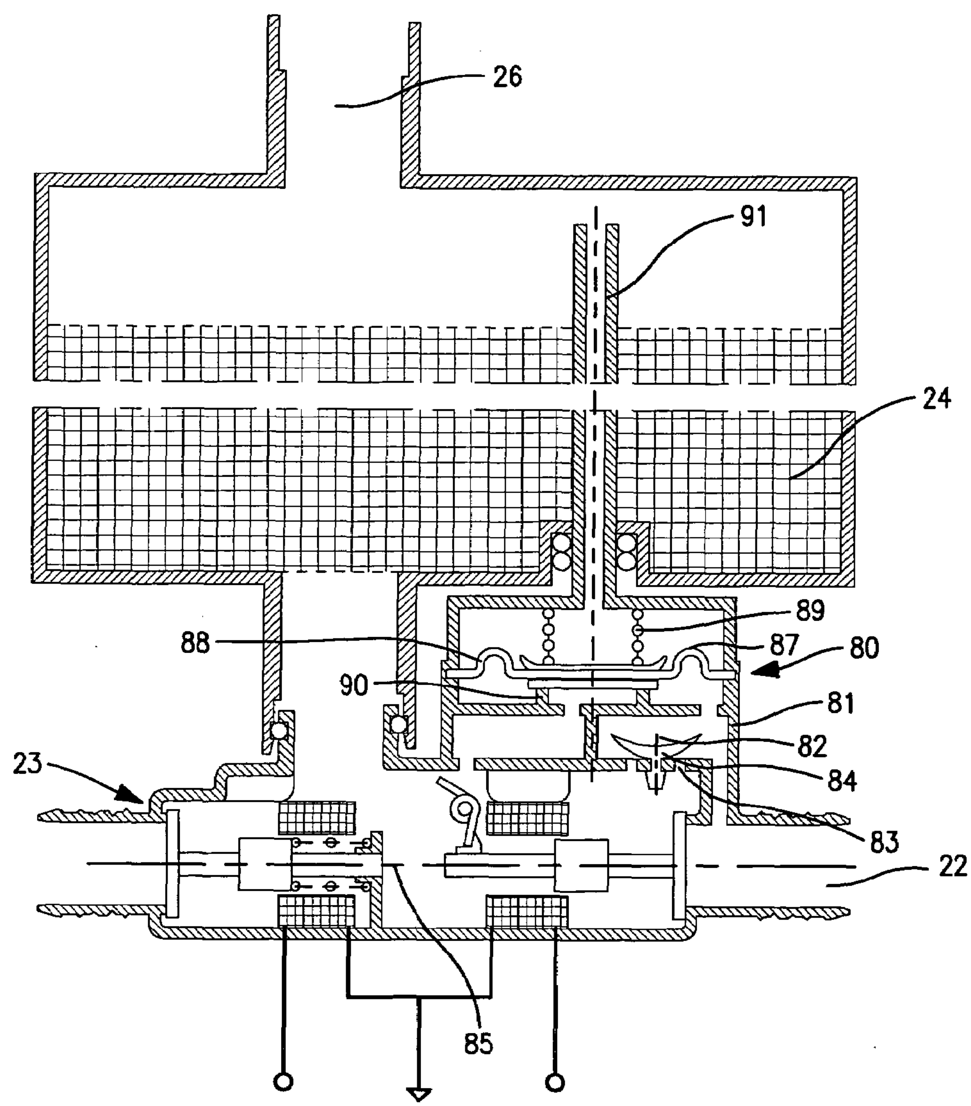
FIG. 6 represents detail A in a fifth operating setting.

In FIG. 6, the two-way valve unit 23 has tacked on to it a further pressure-equalizing valve unit 80. This creates a bypass and could also be separate from the valve unit 23 and connected thereto by lines. It has the purpose of preventing both the creation of an overpressure and the creation of an underpressure in the tank 1. In its housing 81, two flow paths are respectively operated by an automatic valve. A first valve chamber 82 is connected, on the one hand, to the first line 22 and thus to the inside of the tank 1 and, on the other hand, via openings 83, to the interior 85 of the two-way valve unit 23. The openings 83 can be covered by an elastic valve plate 84.

When, on the side of the first line 22, a higher pressure prevails than in the interior 85, the valve plate 84 is forced onto the openings 83. If the pressure in the first line 22 and thus in the first valve chamber 82 is an underpressure, however, then the valve plate 83 is raised and air from the third line 26 can flow, via the interior 85 and the first line 22, inside the tank 1. The mushroom valve thus works in the manner of a reverse-fitted nonreturn valve. The valve body can be realized very variedly. A soft valve plate 83 has the advantage of opening even at very small underpressures in the tank 1.

In the housing 81 of the pressure-equalizing valve 80 there is additionally formed a second valve chamber 87, which is divided by a membrane 88 into an upper and a lower subspace. The membrane 88 is forced by a compression spring 89 against a valve seat 90. In the lower part of the second valve chamber 87, that is the part below the membrane 88, the pressure prevailing in the first line 22, i.e. the pressure inside the tank 1, prevails. In the upper part of the second valve chamber, atmospheric pressure prevails. In order to ensure this, said subspace must be connected to the atmosphere. For this purpose, a fourth line 91 is provided, connecting the upper part of the second valve chamber 87 to the atmosphere. In the shown illustrative embodiment, the fourth line is a pipe which penetrates inside the activated carbon filter 24 and which, avoiding the activated carbon filling, is open to the third line 26 and thus to the atmosphere. In the setting shown in FIG. 6, an equalization takes place of the underpressure prevailing inside the tank 1.

Figure 7:
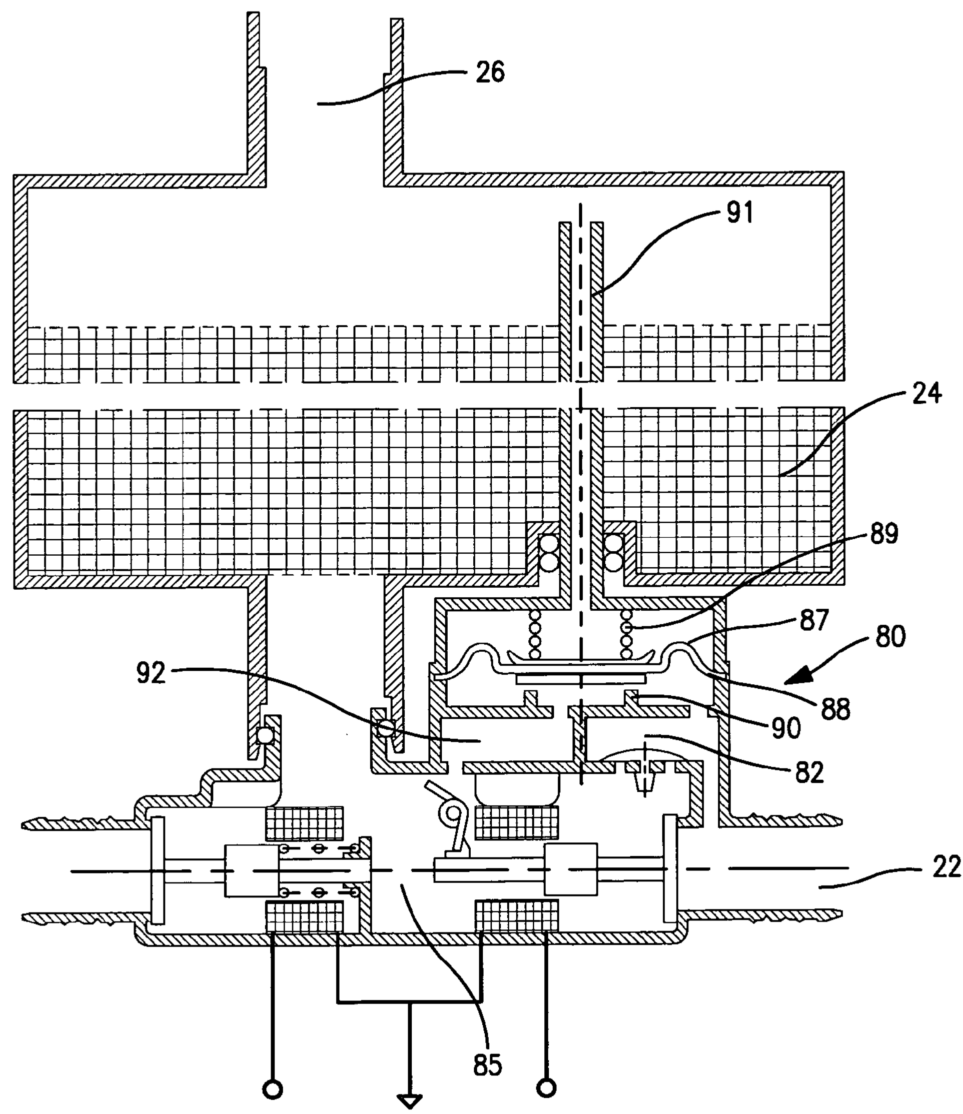
FIG. 7 represents detail A in a sixth operating setting.

FIG. 7 shows a pressure-equalizing valve unit 80 in the equalization of an overpressure prevailing in the tank 1, as is generated, for example, when the tank 1 is warmed on a hot day. The membrane 88 in the second valve chamber 87 compares the atmospheric pressure prevailing above it to the pressure prevailing below it, the pressure in the first line 22. It is connected by the first valve chamber 82 to the second valve chamber 87. If the latter pressure is so much higher than the atmospheric pressure that the membrane is raised counter to the force of the spring 89, then vapor-containing air from inside the tank 1 can flow past the valve seat 90 through a further chamber 92 into the interior 85 of the valve unit 23 and through the activated carbon filter 24 and the third line 26 into the open.

The invention claimed is:

1. A fuel tank with ventilation system, wherein the fuel tank (1) has a filler pipe (5) comprising a filler neck (6), with refueling sensor (7), and a liquid level sensor (13), and the ventilation system comprises an activated carbon filter (24) which, on the one hand, is connected by a first line (22) to a vapor space of the fuel tank (1) and by a second line (25) to the induction tract of an internal combustion engine, and, on the other hand, by a third line (26) to the atmosphere, and further comprising:

a) a controlled two-way valve unit (23), whereof the first path connects the first line (22) to the third line (26) and the second path connects the second line (25) to the third line (26), and b) an electronic control unit (28), which on the input side is connected to the refueling sensor (7) and to the liquid level sensor (13) and on the output side is connected to the controlled two-way valve unit (23).

2. The fuel tank with ventilation system as claimed in claim 1, wherein the two-way valve unit (23) opens up the first path when the refueling sensor (7) indicates a refueling situation and when the fill level sensor (13) indicates a value below a specific fill level; and closes off the first path once the specific fill level is reached, and in that the two-way valve unit opens up the second path when the activated carbon filter (24) is due to be scavenged.

3. The fuel tank with ventilation system as claimed in claim 2, wherein the two-way valve unit, after the specific fill level has been reached, closes off the first path for a specific period and then reopens it.

4. The fuel tank with ventilation system as claimed in claim 1, wherein an automatic valve (21) is provided in the first line (22).

5. The fuel tank with ventilation system as claimed in claim 4, wherein the automatic valve (21) in the first line (22) is a rollover valve.

6. The fuel tank with ventilation system as claimed in claim 5, wherein the rollover valve (21) is provided in a separating vessel (14) provided in the tank (1) and flow-connected to the inside of the fuel tank (1).

7. The fuel tank with ventilation system as claimed in claim 1, wherein at least one pipe (15) is run from the separating vessel (14) to a higher situated point inside the fuel tank (1), which pipe ends there with a slosh valve (16).

8. The fuel tank with ventilation system as claimed in claim 1, wherein the controlled two-way valve unit (23) is fitted to the activated carbon filter (24).

9. The fuel tank with ventilation system as claimed in claim 1, wherein the entire ventilation system (20) is fitted inside the fuel tank (1).

10. The fuel tank with ventilation system as claimed in claim 1, wherein the controlled two-way valve unit (23) comprises two valves (45, 46) accommodated in a common housing (40) and having closing bodies (47, 48), whereof the first (47) closes off or opens up the first path and the second (48) closes off or controllably opens up the second path.

11. The fuel tank with ventilation system as claimed in claim 10, wherein the housing (40) of the controlled two-way valve unit (23) has three line connections (41, 42, 43) in T-arrangement, the line connections (41, 42) to the fuel tank (1) and to the internal combustion engine lying in a first common axis (44) and the line connection (43) to the third line (26) transversely thereto, and in that the two closing bodies (47, 48) are displaceable along a second common axis (44), the two axes (44) being at least parallel, and in that the first closing body (47) interacts with a valve seat (49) assigned to the first line connection (41) and the second closing body (48) interacts with a valve seat (50) assigned to the second line connection (42), each closing body (47, 48) boasting its own electric actuator (54, 55, 57, 58) and the closing directions of the two closing bodies (47, 48) being mutually opposed.

12. The fuel tank with ventilation system as claimed in claim 11, wherein, for the actuation of the first closing body (47), a magnetic coil (55), acting in the direction of opening, and a flip-flop spring (56) are provided and, for the actuation of the second closing body (48), a magnetic coil (58) is provided, which acts upon said second closing body, in a controllable manner in the direction of opening, counter to the force of a spring (59), the first valve (45) being brought into the closed setting once the second valve (46) is fully opened.

13. The fuel tank with ventilation system as claimed in claim 12, wherein the second valve (46) is coupled to the first valve (45) by mechanical persuasion of that end (70) of the second closing body (48) facing away from the second valve seat (50) onto that end (71) of the first closing body (47) facing away from the first valve seat (49).

14. The fuel tank with ventilation system as claimed in claim 1, wherein between the first line (22) and the third line (26) there exists a bypass (82, 87, 92, 85), in which a pressure-equalizing valve unit (80) is provided.

15. The fuel tank with ventilation system as claimed in claim 14, wherein the pressure-equalizing valve unit (80) contains an overpressure valve (87, 77, 89, 90) and an underpressure valve (83, 84), the overpressure valve having a closing element (88) which, on the one hand, is connected to the inside of the fuel tank (1) and, on the other hand, is connected to the atmosphere, and the underpressure valve (83, 84) being a nonreturn valve which opens in case of underpressure in the fuel tank (1) and closes in case of overpressure.

16. The fuel tank with ventilation system as claimed in claim 15, wherein the pressure-equalizing valve unit (80) is structurally combined with the two-way valve unit (23).

17. A fuel tank with ventilation system, wherein the fuel tank (1) has a filler pipe (5) comprising a filler neck (6), with refueling sensor (7), and a liquid level sensor (13), and the ventilation system comprises an activated carbon filter (24) which, on the one hand, is connected by a first line (22) to a vapor space of the fuel tank (1) and by a second line (25) to the induction tract of an internal combustion engine, and, on the other hand, by a third line (26) to the atmosphere, an electronic control unit (28) being provided, which on the input side is connected to the refueling sensor (7) and to the liquid level sensor (13) and on the output side is connected to the controlled valves, in such a way that the first (22) and the third line (26), and also the second (25) and the third line (26), can be mutually connected, wherein the controlled valves are amalgamated into a controlled two-way valve unit (23), whereof the first path connects the first line (22) to the third line (26) and the second path connects the second line (25) to the third line (26).

* * * * *